Figure 3:
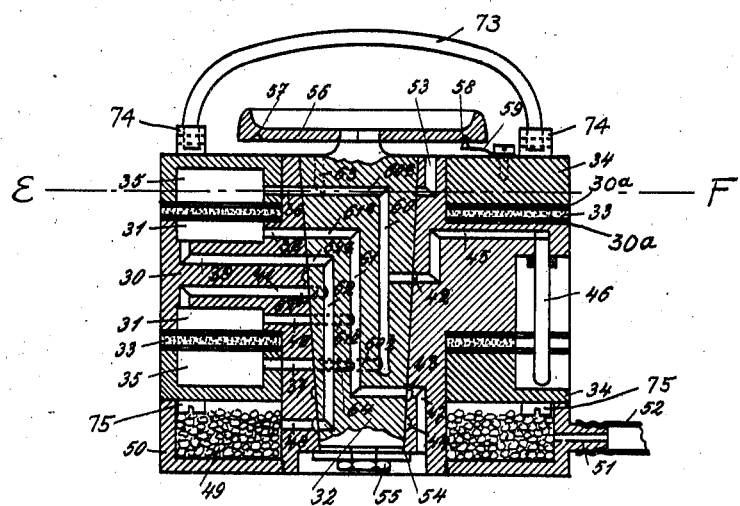

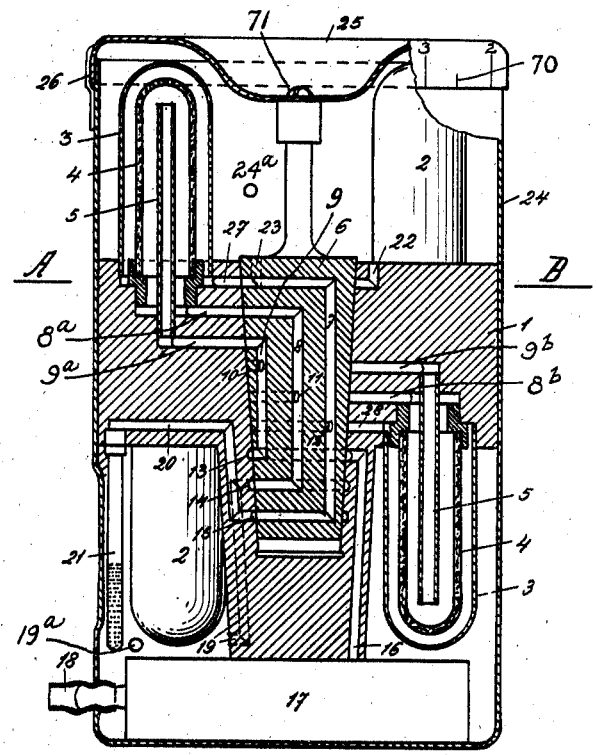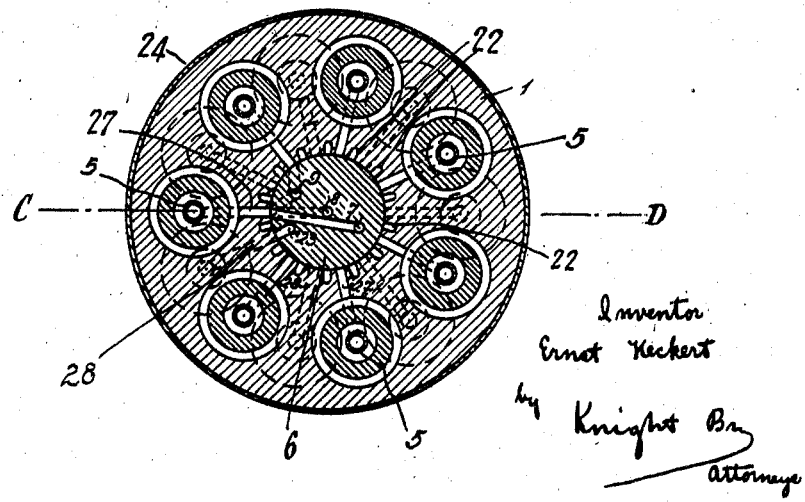

Feb. 11, 1930. E. HECKERT 1,746,425
MINE GAS DETECTOR
Filed Oct. 16, 1924   3 Sheets-Sheet 2

Inventor
Ernst Heckert
by Knight Bro
attorneys

Feb. 11, 1930.  E. HECKERT  1,746,425
MINE GAS DETECTOR
Filed Oct. 16, 1924  3 Sheets-Sheet 3

INVENTOR
Ernst Heckert
BY
his ATTORNEYS

Patented Feb. 11, 1930

1,746,425

UNITED STATES PATENT OFFICE

ERNST HECKERT, OF KIEL, GERMANY

MINE-GAS DETECTOR

Application filed October 16, 1924, Serial No. 744,006, and in Germany October 25, 1923.

The invention refers to an arrangement for indicating the presence of gases and safeguarding against explosion. Such arrangements are especially employed to indicate the presence of gases in mines, the so-called fire-damp. Fire-damp has in the last decades caused the death of a large number of people, so that the problem to make it recognizable has existed for a long time. The object of this application forms a possibility of solution. This problem was partly solved by Davis' safety lamp which, however, has the great disadvantage of not being sufficiently safe against explosions, so that to a great extent electric mine lamps are employed, although these fail to possess the quality of indicating fire-damp. Besides this, a large number of different proposals have been made up to the present to construct a serviceable indicator of fire-damp. These proposals usually depend on the catalytic effect of a glowing wire. The result of this arrangement naturally is, that finally the safety against fire-damp of such contrivances is again not perfect.

Besides this it has been known for several decades that a diffusion cell, i. e. a space closed in by a porous wall, can be employed for indicating the presence of gases. The speed of diffusion of gases through a porous wall is about proportional to the density of the gases. If a porous cell filled with air is placed in a space partly filled with a lighter gas, the lighter gases will penetrate more rapidly into the interior of the cell than the heavier air will escape out of it. Consequently an increase of pressure will be observed within the cell which can be read by means of any suitable pressure gauge, for example by a U-shaped tube partly filled with water. Such a diffusion cell permits fairly exact measurements and is absolutely safe against explosions, as no heat development takes place in it. I am not aware that such an arrangement has been suggested before for a portable fire-damp indicator. The reason for this I believe to be that naturally only one reading can be made, and after this reading it must again be filled with fresh air before a new observation can be made. Consequently it is necessary to bring such a diffusion cell after each observation into a space filled with air in order to prepare it for renewed use.

According to the invention a serviceable portable fire-damp indicator has been constructed by uniting a number of diffusion cells in an easily portable arrangement and contrivances have been provided to bring these diffusion cells consecutively in contact with the gas-air mixture to be tested and to connect them to a pressure gauge. Such a contrivance permits as many measurements being made as diffusion cells exist. As the size of a single cell can be considerably decreased without impairing the correctness of the result very much, it is a simple matter to construct easily portable contrivances about the size of the usual mine lamp with about 25 diffusion cells, i. e. to enable the miner to make 25 observations consecutively. That is sufficient for ordinary use as the miner charged with the watch in mines especially exposed to fire-damp is quite able to carry several fire-damp indicators with him when going under ground and to place those not in use on the level of the mine until he has made the first 25 measurements.

The drawing shows several constructions of the invention.

Figure 4:
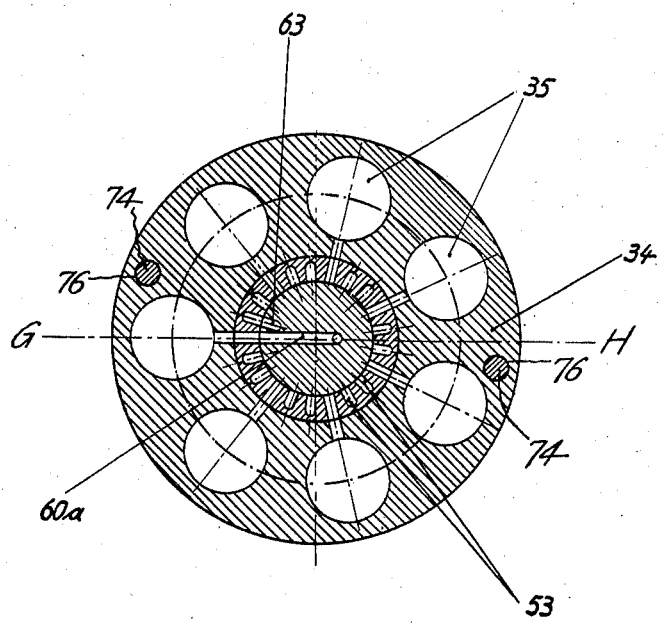

Fig. 1 showing a longitudinal vertical section on the line C—D, Fig. 2, of a fire-damp indicator having vertically disposed diffusion cells;

Fig. 2 showing a transverse section thereof, on the line A—B, Fig. 1;

Fig. 3 showing in sectional elevation a similar fire-damp indicator having horizontally disposed diffusion cells, the section being taken on the line G—H in Fig. 4, with the exception that the channel 53 is in Fig. 3 included in this section for clearness sake, whereas in reality, as appears from Fig. 4, the section line runs between two adjacent channels 53; an Fig. 4 showing a transverse section taken on the line E—F in Fig. 3.

In Figs. 1 and 2, 1 represents a cylindrical metal body, at each end of which seven diffusion contrivances are arranged in a circle. Each such diffusion contrivance is composed of an outer metal cylinder 3 closed at one end and having concentrically disposed therein a similar, but somewhat smaller, cylinder 4 of porous material, both cylinders being secured to the body 1 by their open ends. A pipe 5 similarly fixed to the body 1 and extending inside the diffusion cylinder 4 serves as a gas conductor to the latter. 6 is a cock-body ground into a bore of the body 1 and provided with C-shape channels 7, 8 and 9, which in Fig. 1 appears to be located in the same sectional plane C—D (Fig. 2) on which Fig. 1 is taken. This showing has been made in Fig. 1 for clearness sake. The actual positions of these channels, and those of channels 10 to 12 appear from Fig. 2, and some, as will be seen from that figure are in reality located outside of the sectional plane C—D. The three horizontal channels 10, 11 and 12 branch from channels 9, 8 and 7 respectively. In the body 1 three ring channels 13, 14 and 15 are so arranged that for every position of the cock they are in connection with the channels 9, 8 and 7. The ring channel 13 is connected to a chamber 17 by means of a channel 16, the chamber being filled with a suitable material for separating the water vapour from carbonic acid. 18 is a hose connection through which, for example by means of a rubber ball blower (not shown, the atmospheric mixture surrounding the apparatus is pressed into the reservoir 17. The ring channel 14 is in connection with the interior of the lower casing through a channel 19, and the ring channel 15 is connected by a channel 20 with a U-shaped gauge pipe 21 partly filled with a liquid. It should be noted from Fig. 1 that channel 19 lies behind channel 20. A standard gas, for instance air, can be blown into the lower casing through an opening 19ª, to admit the standard gas to channel 19. In Fig. 1, 22 represents one of a group of angular passages in body 1 radiating from the inner periphery of the conical boring in which cock 6 is seated. The location of the entire group can be clearly seen in Fig. 2. They all terminate at their upper ends on the surface of body 1, and thus establish communication with the interior of the upper casing 24, into which air or any other standard gas can be blown through an opening 24ª. 23 is an angular channel provided in the cock and also in connection with the interior of the upper casing. This casing 24 is formed by a sheet metal protective mantel which can be pushed over the whole contrivance, and 25 is a rotatably supported cover which is fixed by screw 71 to the cock-body when mounted. A scale 70 may be engraved on the rim of this cover indicating by means of a hand 26 on casing 24, which cells have already been used, and with which measurements can still be carried out. 27 represents in the section of Fig. 2 the seven openings of the upper diffusion cells, which openings are adapted to register with the upper opening of the channel 7, and the dotted channels represented by 28 belong to the seven lower diffusion cells, and are adapted to register with channel 12 connected to passage 7.

Though this particular feature does not form part of the present invention, it may be mentioned that the different channels and passages in the casing body 1 and in the cock-body may be formed in various ways. For instance, the casing 1 and the cock-body 6 each may be metal castings into the moulds of which cores are set at the places where the channels are to be located. Another way may be as follows. For instance, with reference to the cock-body 6 and with particular reference to the C-shaped channel 7 in Fig. 1 which is the most difficult to form, this passageway may be made by drilling. First a transverse hole is drilled through the cock where the upper transverse portion is located, and also where the lower transverse portion of the C-shaped passage is located. Thereupon a hole is drilled in axial direction along the line where the vertical portion of the passage is located, which hole strikes the transverse drilling. Then the ends of these holes for instance the right hand ends of the upper and lower passages are plugged up again and likewise the top and bottom end of the vertical passage is plugged up so that the C-shaped passage shown in Fig. 1 remains. Similar procedures may be followed with the remaining passageways and channels. This is a procedure not claimed here or described as new, but quite an ordinary shop practice and merely suggested here without illustrating the details, in order to give an idea to the reader how one may proceed in forming these passages.

The method of working the contrivance is as follows:

The contrivance is ready for use, as shown in the drawing, with the left top diffusion cell shown in section. In order to make an examination, the air surrounding the apparatus is pressed into the chamber 17 through the hose 18 and is freed in the chamber of water vapour and carbonic acid; it then enters a cell 5 through the channels 16, 13 and 9, flows through the space between the tube 5 and the diffusion cylinder 4 from top to bottom and leaves the apparatus through the channel 8, the ring space 14, and the dotted connection leading to the channel 19. If the air now contains a lighter gas, say methane, it passes through the wall of the diffusion cylinder 4 into the space between the cylinder 4 and the cylinder 3, and increases the internal pressure in this space. As the latter is in connection with the tube gauge 21 by means of the channels 27 and 7, the ring channel 15 and the channel 20, the pressure variation and consequently the percentage of methane is measured at the gauge pipe. After the measurement has been carried out, the apparatus remains unaltered until the cover 25 is turned 1/14 of a complete revolution during which the used diffusion cell is brought into communication with the outer air temporarily through the channel 23, whereby the pressure in the gauge is returned to normal. At the completion of this fraction of a turn the next of the lower cells is connected to the gauge pipe 21 and the cleansing chamber 17, by means of the channels 10, 11, 12, so that the contrivance is ready for the next measurement. The normal pressure in gauge 21 is restored after each measurement, while the cock is turned into position for the next measurement, because while the cock is thus on its way the channel 7 registers with one of the group of ducts 22 leading into the upper casing. These ducts, as is shown in Fig. 2, are spaced around the cock 6. During this registering, the gauge 21 is connected with the upper casing 24, in which atmospheric pressure exists by way of channel 20, ring channel 15, channel 7 and the then registering duct 22.

After measurements have been carried out with all cells, the contrivance can again be restored for use by scavenging all diffusion cylinders 4 consecutively with fresh air forced through the hose 18.

The number of diffusion contrivances fitted to an apparatus can be increased at will, if it should appear necessary. Another arrangement of the individual diffusion contrivances can be made, but the annular arrangement would in general be recommended as a common operating means is especially easily arranged therefor.

If a single pressure gauge is to be employed for several diffusion cells, the diffusion capacity of the individual cells must naturally be the same. The exact determination of the diffusion capacity causes considerable difficulties at present, as the diffusion capacity is, in a great degree, dependent on the ignition temperature and the time of the ignition of the cell. For this reason the diffusion cells employed for an apparatus must be chosen with a view of closest possible equality of capacities. Similarly, spare cells must be tested and chosen under this aspect.

This difficulty can be decreased or completely removed by forming the diffusion walls of several diffusion contrivances from a single porous unit. A single porous unit can easily be made, so that its diffusion capacity is uniform throughout all of its portions. Consequently the pressure gauge co-operating with all cells having the diffusion unit in common will give indications on an equal basis.

Such porous units are shown in Fig. 3. In this figure 30 is a compact block, for instance of brass, in which two annular superposed rows of chambers 31 are arranged. A cock-body 32 is fitted inside a longitudinal opening in the block 30, the functions of which are the same as those of the cock 6 in Fig. 1. The body 30 is rabbeted at both ends so that chambers 31 become exposed and annular plates 33 of porous material are placed upon the flat surfaces of the rabbets so as to cover chambers 31. Over rings 33 annular metal bodies 34 are placed in which chambers 35 are provided similar to chambers 31 and respectively registering with the latter. The individual chambers 31 together with the respective opposite chambers 35 form the diffusion cells of the apparatus, the gas-air mixture to be tested being conducted to chamber 35. Porous rings 33 are joined gas tight with the respective apparatus portions 30 and 34 by means of packing rings 30$^a$. Individual channels 36 lead from the upper chambers 35 to the cock 32, and individual channels 37 lead from the lower chambers 35 also to the cock. The entire body thus formed is held together by two bolts 74, passing through holes 76 provided in the different layers (see Fig. 4), and by screws 75 threaded into these bolts. The bail 73 is attached to the upper ends of these bolts.

Bores 38 and 39 lead from the upper chambers 31 to the cock and bores 40 and 41 from the lower chambers 31 to the cock. Besides three ring channels 42, 43 and 44 are provided in the block 30. Of these channels 42 is by a bore 45 in connection with a pressure gauge 46 composed of a U-shaped glass tube partly filled with liquid. This pressure gauge is arranged in a separate recess in the block 30 and in a portion of the lower ring 34 where the tube is protected from damage. The ring channel 43 is in connection with the outer air by way of bore 47 and the ring channel 44 communicates with a chamber 49 through a bore 48, this chamber being cut off from outside by a cap 50 threaded to the lower end of body 30. Chamber 49 is filled with a chemical absorbing water. It can also, if the presence of fire-damp is to be ascertained contain chemicals absorbing carbonic acid which often exists in mines. Chamber 49 may be connected to any pumping contrivance by a pipe connection 51 and a hose 52 thus making it possible to force into chamber 49 the gas-air mixture surrounding the apparatus and which is to be tested. Finally the block 30 contains as many bores 53, arranged circularly around the cock 32, as there are diffusion cells in the apparatus. The cock 32 is held in place by a washer 54 and nut. It can easily be turned by hand through a disk 56. On the lower side of the disk there are as many indentures 57 as the contrivance contains diffusion cells. A spring 59 having a catch 58 engages these indentures showing the operator, the particular diffusion cell brought into testing position. The cock proper contains a number of bores serving exactly the same purpose and running similarly to the bores shown in Figs. 1 and 2. The C-formed bore 60 permits the connection of the bores 36 and 37 with the ring channel 42. It is assumed that the contrivance contains fourteen diffusion cells the same as Figs. 1 and 2. In this case the horizontal upper and lower parts of the bore 60, namely $60^a$ and $60^b$ within the cock radiate at an angle relatively to each other equal to $360° : 14 =$ about $26°$. A second bore 61 makes it possible to connect the channels 37 and 40 with the ring channel 43. The horizontal parts $61^a$ and $61^b$ are similarly at an angle, in plan of about $26°$. The bore 62 enables the connection of the bores 39 and 41 with the ring channels 44. The horizontal parts $62^a$ and $62^b$ are also turned by about $26°$. Finally a rectangular bore 63 is provided in the cock 32 and at an angle to the plane of the bores $60^a$, $61^a$, and $62^a$ of about $360° : 28 = 13°$. A bore 64 within the cock shown, in Fig. 3 in dotted lines, leads from the channel 61 in the plane of the channel 37 so that it can register with the latter, and it is also at an angle of about $13°$ to the plane of the bores $60^b$, $61^b$ and $62^b$.

The above described contrivance is operated as follows:

In the position of the cock 32 shown in the drawing the upper left diffusion cell 35 is connected by the bores 36, $60^a$, 60 and 45 with one side of the pressure gauge. Chamber 31 registering with this diffusion cell is in connection with the outer air by the bores 40, $61^a$, 61, 43 and 47 and with the space 49 by the bores 39, $62^a$, 62, and 48. All other diffusion cells of the contrivance together with their pertaining chambers 31 are tightly closed against the outside. In order to carry out a measurement the gas-air mixture to be tested is pumped into the chamber 49 by a pumping arrangement attached to the hose 52 and thus freed from the water-vapor possibly contained in it. It can pass from chamber 49 into chamber 31 through the bores 48, 62 and 39 and from this chamber into the atmosphere through the bores 38, 61 and 47. The gas-air mixture is led along the porous wall 33 in chamber 31 then in operation. The lighter gases contained in the mixture to be tested pass more rapidly into cell chamber 35, than air does, the result being an increase in pressure in cell chamber 35 which is transferred through the bores 36, 60 and 45 on to the pressure-gauge 46 and can there be read. If a second reading should be carried out, the cock 32 is turned by means of the handle 56 1/14 of a revolution, i. e. by about $26°$. In the middle between the starting point and the position attained by a shifting through $26°$ the following connections result temporarily:

The bore $60^a$ is connected to a bore 53 temporarily, so that the pressure gauge 46 is put in connection with the outer air through the bores 45, 60 and 53 and thus restored to the position corresponding with the pressure outside. Simultaneously the next cell 35 of the lower row is connected with the outer air by the bore 64, so that the pressure inside the diffusion cell used for the next measurement adjusts itself to the pressure existing outside. There is no risk that gas pass into the diffusion cell on account of the length of the connecting bores and the short connecting period. In the subsequent position obtained by completing the turn through $26°$ the next diffusion cell 35 lying in the lower row is connected to the pressure gauge by the bore $60^b$ and the chamber 31 registering with it to the outer air and the ring space 43 by the bores 40 and $41^b$ appertaining to it, so that the next measurement can be carried out in the manner described above. In the succeeding measurement one of the diffusion cells lying in the upper row is employed for measuring. The pressure adjustment in the intermediary position taking place by way of the bore 63 within the cock and one of the bores 53 again serves to restore normal pressure in the pressure gauge.

There is the possibility in the contrivance described above that gases may pass through the porous walls 33 horizontally into adjoining cells not in position for measurements at that time. This possibility can easily be avoided by saturating the plates 33 at those portions, not located within the space of the different cells with a suitable fluid and thus making them impenetrable to gases. Fluids especially suitable for this purpose are such as will congeal or harden at normal temperature for example asphalt-varnish or the like.

The number of diffusion cells united in a contrivance can naturally be increased at will, though for clearness sake only fourteen diffusion cells are shown in the several modifications. It is generally advantageous to construct contrivances with twenty to thirty diffusion cells and to then employ if this number be insufficient, several apparatus consecutively so as not to render each apparatus too cumbersome to handle.

I claim:—

1. In a device for indicating the presence of certain gases in gas mixtures, a pressure gauge, a plurality of diffusion cells each comprising a pair of cell chambers separated by a porous division wall and means for throwing one chamber of each pair comprising a cell into connection with said pressure gauge and for simultaneously admitting to the other chamber of the pair gas mixture to be tested.

2. In a device for indicating the presence of certain gases in gas mixtures, a pressure gauge, a plurality of diffusion cells, each comprising a pair of cell chambers separated by a porous division wall, one of the chambers of each cell containing the same standard comparison gas, means for simultaneously connecting the gas-charged chamber of a cell with said pressure gauge and the other chamber of that cell with the gas mixture to be tested, said means adapted, before connecting said gauge and gas-charged chamber together, to connect each temporarily to the atmosphere, and being further adapted to connect, as specified above, the chambers of the plurality of cells successively.

3. In a device for indicating the presence of certain gases in gas mixtures, a pressure gauge, a plurality of diffusion cells, each comprising a pair of cell chambers, a porous division wall unit suitably disposed to separate the chambers of a plurality of cells, one of the chambers of each cell containing the same standard comparison gas and means for throwing the standard gas chambers of said cells consecutively into connection with said pressure gauge and, when effecting this connection to one chamber of a cell, for simultaneously admitting to the other chamber of that cell gas mixture to be tested.

4. In a device for indicating the presence of certain gases in gas mixtures, a pressure gauge, a plurality of diffusion cells, each comprising a pair of cell chambers, a porous division wall unit suitably disposed to separate the chambers of a plurality of cells, one of the chambers of each cell containing the same standard comparison gas, means for throwing the standard gas chambers of said cells consecutively into connection with said pressure gauge, for simultaneously admitting to the other chamber of the gaugeconnected cell gas mixture to be tested, and means for previously connecting the pressure gauge and the cell chamber about to be connected together, each temporarily with the outer atmosphere.

5. In a device for indicating the presence of certain gases, in gas mixtures a pressure gauge, a plurality of diffusion cells, each comprising a pair of opposed chambers, a porous division wall unit suitably disposed to separate the chambers of the plurality of cells, the portions of said unit not exposed in the chambers being saturated with a suitable filler to render such portions impervious to gases, one of the chambers of each cell containing the same standard comparison gas and means for throwing the standard gas chamber of a cell into connection with said pressure gauge and for simultaneously admitting to the other chamber of that cell gas mixture to be tested.

6. In a device for indicating the presence of gases in air, a pressure gauge, a plurality of diffusion cells, each comprising a pair of opposed chambers, a porous division wall unit suitably disposed to separate the chambers of the plurality of cells, the portions of said unit not exposed in the interior of the chambers being saturated with a suitable filler to render said wall portions impervious to gases, one of the chambers of each cell containing pure air, means for throwing the air chamber of a cell into connection with said pressure gauge and for simultaneously admitting to the other chamber of that cell gas-air mixture to be tested, and means for previously connecting the pressure gauge and the cell chamber about to be connected together, each temporarily with the atmosphere.

In testimony whereof I affixed my signature.

ERNST HECKERT.